United States Patent
Franklin et al.

(10) Patent No.: US 10,301,930 B2
(45) Date of Patent: May 28, 2019

(54) SYSTEM AND METHOD FOR A BENCHMARK PRESSURE TEST

(71) Applicants: INNOVATIVE PRESSURE TESTING, LLC, Fulshear, TX (US); Charles M. Franklin, Katy, TX (US); Richard A. Cully, Katy, TX (US)

(72) Inventors: Charles M. Franklin, Katy, TX (US); Richard A. Cully, Katy, TX (US)

(73) Assignee: INNOVATIVE PRESSURE TESTING, LLC, Fulshear, TX (US)

( * ) Notice: Subject to any disclaimer, the term of this patent is extended or adjusted under 35 U.S.C. 154(b) by 516 days.

(21) Appl. No.: 14/655,513

(22) PCT Filed: Oct. 17, 2013

(86) PCT No.: PCT/US2013/065413
§ 371 (c)(1),
(2) Date: Jun. 25, 2015

(87) PCT Pub. No.: WO2015/057226
PCT Pub. Date: Apr. 23, 2015

(65) Prior Publication Data
US 2015/0354346 A1    Dec. 10, 2015

(51) Int. Cl.
*E21B 47/10* (2012.01)
*G01M 3/28* (2006.01)
*G01M 3/26* (2006.01)

(52) U.S. Cl.
CPC ........... *E21B 47/1025* (2013.01); *G01M 3/26* (2013.01); *G01M 3/28* (2013.01); *G01M 3/2807* (2013.01)

(58) Field of Classification Search
CPC ........ E21B 47/1025; G01M 3/26; G01M 3/28
See application file for complete search history.

(56) References Cited

U.S. PATENT DOCUMENTS

| 3,604,256 A | 9/1971 | Prats |
| 4,269,061 A | 5/1981 | Hatsuno et al. |
| 4,383,436 A | 5/1983 | Hailey |

(Continued)

FOREIGN PATENT DOCUMENTS

| DE | 2916550 A1 | 10/1979 |
| GB | 2450905 A  | 1/2009 |

(Continued)

OTHER PUBLICATIONS

PCT International Search Report and Written Opinion dated Jul. 11, 2014 for International Application No. PCT/US2013/065413 filed Oct. 17, 2013.

(Continued)

*Primary Examiner* — David Z Huang
(74) *Attorney, Agent, or Firm* — Conley Rose, P.C.

(57) ABSTRACT

A method for determining the presence of a leak in a pressure system. The method includes receiving pressure data of the pressure system after shut-in of the pressure system, determining a pressure slope based on the pressure data, entering a passing state in response to the slope being less than a predetermined slope threshold, exiting the passing state in response to the slope being greater than the predetermined slope threshold, and generating a passing indication as a result of remaining in the passing state for at least a predetermined time period.

20 Claims, 6 Drawing Sheets

(56) References Cited

U.S. PATENT DOCUMENTS

| | | |
|---|---|---|
| 4,441,357 A | 4/1984 | Kahn et al. |
| 4,608,857 A | 9/1986 | Mertens et al. |
| 4,826,482 A | 5/1989 | Kamen |
| 4,899,573 A | 2/1990 | Dimmick et al. |
| 4,947,352 A | 8/1990 | Jenkins |
| 5,078,006 A | 1/1992 | Maresca, Jr. et al. |
| 5,090,234 A | 2/1992 | Maresca, Jr. et al. |
| 5,163,314 A | 11/1992 | Maresca, Jr. et al. |
| 5,189,904 A | 3/1993 | Maresca, Jr. et al. |
| 5,375,455 A | 12/1994 | Maresca, Jr. et al. |
| 5,526,679 A | 6/1996 | Filippi et al. |
| 5,586,050 A | 12/1996 | Makel et al. |
| 5,948,969 A | 9/1999 | Fierro et al. |
| 6,082,182 A | 7/2000 | Fierro et al. |
| 6,082,184 A | 7/2000 | Lehmann |
| 6,244,100 B1 | 6/2001 | Hastings et al. |
| 6,279,383 B1 | 8/2001 | Balke et al. |
| 6,311,548 B1 | 11/2001 | Breidenbach et al. |
| 6,370,942 B1 | 4/2002 | Dunfee et al. |
| 6,549,857 B2 | 4/2003 | Fierro et al. |
| 6,557,530 B1 | 5/2003 | Benson et al. |
| 6,655,422 B2 | 12/2003 | Shock |
| 6,804,991 B2 | 10/2004 | Balschat et al. |
| 7,216,533 B2 | 5/2007 | McGregor et al. |
| 7,231,811 B2 | 6/2007 | Sagi et al. |
| 8,380,448 B2 | 2/2013 | Franklin |
| 9,207,143 B2 | 12/2015 | Franklin et al. |
| 9,518,461 B2 | 12/2016 | Franklin et al. |
| 2002/0120411 A1 | 8/2002 | Fierro et al. |
| 2005/0011252 A1 | 1/2005 | Arima et al. |
| 2005/0222698 A1 | 10/2005 | Eryurek et al. |
| 2006/0032550 A1 | 2/2006 | Wodjenski |
| 2006/0167400 A1 | 7/2006 | Ellingboe et al. |
| 2006/0235448 A1 | 10/2006 | Roslin et al. |
| 2008/0185143 A1 | 8/2008 | Winters et al. |
| 2008/0223111 A1 | 9/2008 | McDonald et al. |
| 2008/0266125 A1 | 10/2008 | Windisch et al. |
| 2009/0012726 A1 | 1/2009 | Furuse |
| 2009/0018782 A1 | 1/2009 | Sameda et al. |
| 2009/0132185 A1 | 5/2009 | Furuse |
| 2009/0322544 A1 | 12/2009 | McDowell |
| 2010/0153027 A1 | 6/2010 | Bredau et al. |
| 2010/0288883 A1 | 11/2010 | Rivot |
| 2010/0313958 A1 | 12/2010 | Patel et al. |
| 2011/0025511 A1 | 2/2011 | Wien |
| 2011/0046903 A1 | 2/2011 | Franklin |
| 2012/0150455 A1 | 6/2012 | Franklin et al. |
| 2012/0265456 A1 | 10/2012 | Snow et al. |
| 2013/0226475 A1 | 8/2013 | Franklin |
| 2014/0111327 A1* | 4/2014 | Naidu .................. F02D 19/021 340/450 |
| 2014/0288858 A1 | 9/2014 | Franklin |
| 2015/0128693 A1 | 5/2015 | Franklin et al. |
| 2015/0354347 A1* | 12/2015 | Franklin ............. E21B 47/1025 702/51 |

FOREIGN PATENT DOCUMENTS

| | | |
|---|---|---|
| JP | 2002243572 A | 8/2002 |
| JP | 2009092585 A | 4/2009 |
| WO | 01/84103 A1 | 11/2001 |
| WO | 01/88549 A1 | 11/2001 |
| WO | 03-046502 A1 | 6/2003 |

OTHER PUBLICATIONS

U.S. Appl. No. 15/479,725 Response to Final Office Action dated Oct. 30, 2017 (9 pages).
European Patent Application No. 13895570.3 Examination Report dated Feb. 27, 2018 (5 pages).
European Patent Application No. 13895777.4 Examination Report dated Mar. 8, 2018 (7 pages).
European Patent Application No. 13895570.3 extended European search report dated Apr. 28, 2017 (9 pages).
European Patent Application No. 13895777.4 extended European search report dated Apr. 28, 2017 (9 pages).
Canadian Patent Application No. 2,926,187 Office Action dated Oct. 21, 2016 (3 pages).
Canadian Patent Application No. 2,926,288 Office Action dated Oct. 21, 2016 (3 pages).
Canadian Patent Application No. 2,926,187 Response to Office Action dated Oct. 21, 2016 filed Mar. 27, 2017 (2 pages).
Canadian Patent Application No. 2,926,288 Response to Office Action dated Oct. 21, 2016 filed Mar. 31, 2017 (2 pages).
European Patent Application No. 10810332.6 extended European search report dated Oct. 29, 2015 (7 pages).
U.S. Appl. No. 15/479,725 Office Action dated Jun. 7, 2017 (13 pages).
U.S. Appl. No. 15/479,725 Response to Office Action dated Jun. 7, 2017 filed Sep. 28, 2017 (15 pages).
International Patent Application No. PCT/US2010/041478 Preliminary Report on Patentability dated Mar. 1, 2012 (10 pages).
International Patent Application No. PCT/US2010/041478 International Search Report dated Feb. 14, 2011 (3 pages).
International Patent Application No. PCT/US2013/065419 International Search Report and Written Opinion dated Jul. 11, 2014 (12 pages).
U.S. Appl. No. 14/296,976 Final Office Action dated Apr. 13, 2017 (17 pages).
U.S. Appl. No. 12/833,216 Office Action dated Jun. 15, 2012 (6 pages).
U.S. Appl. No. 13/291,895 Office Action dated Jun. 19, 2014 (26 pages).
U.S. Appl. No. 14/655,543 Office Action dated Jul. 14, 2017 (17 pages).
U.S. Appl. No. 13/769,037 Office Action dated Sep. 18, 2013 (8 pages).
U.S. Appl. No. 13/291,895 Office Action dated Dec. 18, 2014 (9 pages).
U.S. Appl. No. 13/291,895 Response to Office Action dated Jun. 19, 2014 filed Sep. 19, 2014 (13 pages).
U.S. Appl. No. 13/769,037 Response to Office Action dated Sep. 18, 2013 filed Dec. 17, 2013 (8 pages).
U.S. Appl. No. 13/291,895 Response to Office Action dated Dec. 18, 2014 filed Mar. 18, 2015 (13 pages).
U.S. Appl. No. 14/296,976 Office Action dated Dec. 6, 2016 (16 pages).
U.S. Appl. No. 14/296,976 Response to Office Action dated Dec. 6, 2016 filed Mar. 6, 2017 (20 pages).
U.S. Appl. No. 14/296,976 Response to Final Office Action dated Apr. 13, 2017 filed Sep. 13, 2017 (15 pages).
Canadian Patent Application No. 2,926,187 Office Action dated Sep. 8, 2017 (4 pages).
Canadian Patent Application No. 2,926,288 Office Action dated Sep. 8, 2017 (4 pages).
U.S. Appl. No. 15/479,725 Final Office Action dated Oct. 30, 2017 (16 pages).
U.S. Appl. No. 14/296,976 Office Action dated Oct. 24, 2017 (13 pages).
U.S. Appl. No. 14/296,976 Response to Office Action dated Oct. 24, 2017 (10 pages).
U.S. Appl. No. 14/655,543 Response to Office Action dated Jul. 14, 2017 (11 pages).

* cited by examiner

SYSTEM AND METHOD FOR A BENCHMARK PRESSURE TEST

CROSS-REFERENCE TO RELATED APPLICATIONS

This application is a 35 U.S.C. § 371 national stage application of PCT/US2013/065413 filed Oct. 17, 2013, entitled "System and Method for a Benchmark Pressure Test," which is incorporated herein by reference in its entirety for all purposes.

BACKGROUND

Tubes, valves, seals, containers, tanks, receivers, pressure vessels, pipelines, conduits, heat exchangers, and other similar components, are typically configured to retain and/or transport fluids under pressure. These components may be referred to as a pressure system. One example of a pressure system includes a pipeline for transporting natural gas or other hydrocarbons. Another example is a natural gas well, an oil well, or other types of wells, whether being actively drilled or already producing, that typically transports fluids from a producing geological formation to a well head. Wells may include various components, such as a Christmas tree, a well head, production tubing, casing, drill pipe, blowout preventers, completion equipment, coiled tubing, snubbing equipment, and various other components.

The fluids retained or transported within pressure systems typically include one or more gases, liquids, or combinations thereof, including any solid components entrained within the fluid. A typical fluid may comprise crude oil, methane or natural gas, carbon dioxide, hydrogen sulfide, natural gas liquids, water, drilling fluid, and the like. Other examples include hydraulic fluid within a hydraulic line.

Many pressure systems are tested to ensure that the pressure system is not leaking and that the pressure system is capable of maintaining pressure integrity. However, performing such pressure tests often requires a test pressure within the pressure system to be held for a significant period of time until a steady-state test pressure (i.e., one in which the test pressure changes very little with time) is reached. That is, it may be only after a steady-state pressure is reached that an operator might be assured that a decrease in pressure was a result of the fluid cooling via a transfer of heat from the fluid to the sea and/or other surrounding media rather than because of a leak. In addition, tests may be repeated several times to ensure validity of the tests, which results in even more time spent testing. This testing process is costly because the tests could take from 12 to 24 hours to complete when, for example, an offshore drilling vessel or rig leases for $800,000 per day.

SUMMARY

The problems noted above are solved in large part by a method for determining the presence of a leak in a pressure system. The method includes receiving pressure data of the pressure system after shut-in of the pressure system, determining a pressure slope based on the pressure data, entering a passing state in response to the slope being less than a predetermined slope threshold, exiting the passing state in response to the slope being greater than the predetermined slope threshold, and generating a passing indication as a result of remaining in the passing state for at least a predetermined time period.

The problems noted above may be further solved by another method for determining the presence of a leak in a pressure system. The method includes receiving pressure data of the pressure system after shut-in of the pressure system, determining a pressure slope based on the pressure data, entering a passing state in response to the slope being less than a predetermined slope threshold, exiting the passing state in response to a change in pressure while in the passing state being greater than a maximum permitted change in pressure, and generating a passing indication as a result of remaining in the passing state for at least a predetermined time period.

The problems noted above may be still further solved by a system for determining the presence of a leak in a pressure system. The system includes at least one pressure sensor coupled to the pressure system and a processor coupled to the pressure sensor. The processor receives pressure data from the pressure sensor after shut-in of the pressure system, determines a pressure slope based on the pressure data, enters a passing state in response to the slope being less than a predetermined slope threshold, exits the passing state in response to the slope being greater than the predetermined slope threshold, and generates a passing indication as a result of remaining in the passing state for at least a predetermined time period.

The problems noted above may also be solved by another system for determining the presence of a leak in a pressure system. The system includes at least one pressure sensor coupled to the pressure system and a processor coupled to the pressure sensor. The processor receives pressure data of the pressure system after shut-in of the pressure system, determine a pressure slope based on the pressure data, enters a passing state in response to the slope being less than a predetermined slope threshold, exits the passing state in response to a change in pressure while in the passing state being greater than a maximum permitted change in pressure, and generates a passing indication as a result of remaining in the passing state for at least a predetermined time period.

BRIEF DESCRIPTION OF THE DRAWINGS

For a detailed description of exemplary embodiments of the disclosure, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections.

As used herein, the term "state"—as in "passing state" or "failing state"—refers to the state of a computing device when a particular constraint is satisfied. For example, a computing device may be in a passing state when passing constraints are met and may be in a failing state when failing constraints are met. Further, being in a passing state does not necessarily indicate that a test has been passed and being in a failing state does not necessarily indicate that a test has been failed; in some cases, additional constraints must be satisfied in the passing state for the test to be passed and additional constraints must be satisfied in the failing state for the test to be failed.

As used herein, the terms "rate of change," "slope," and "first derivative" all refer to the same characteristic of a value.

As used herein, the terms "curvature" and "second derivative" all refer to the same characteristic of a value.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
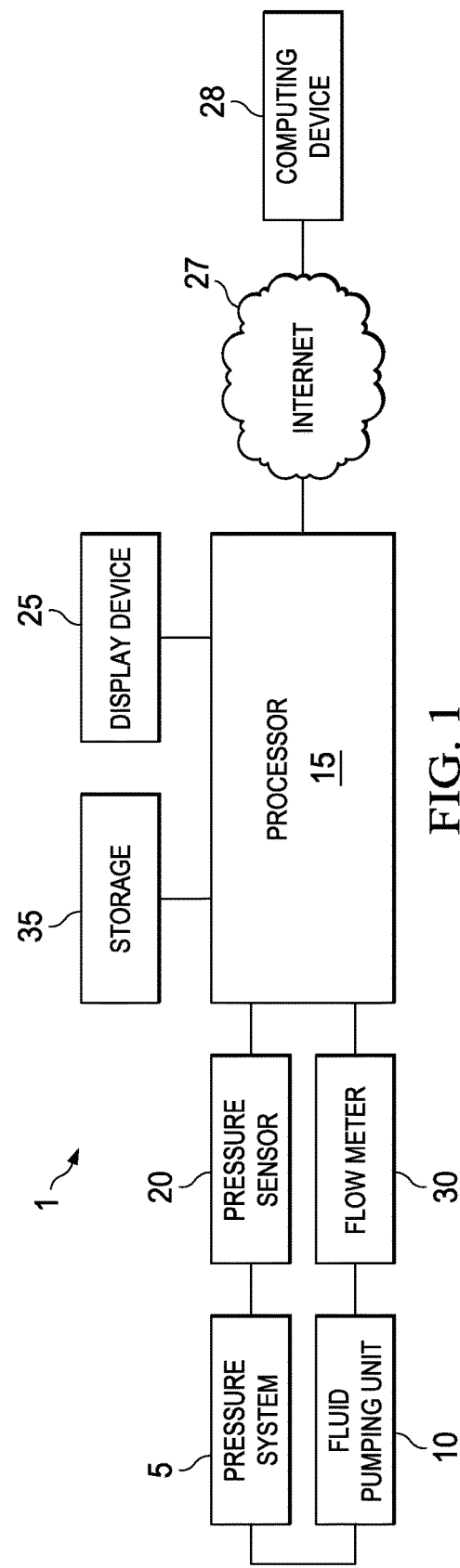
FIG. 1 shows a block diagram of a leak detection system in accordance with various embodiments.

FIG. 1 shows a block diagram of a leak detection system 1 in accordance with various embodiments of the present disclosure. The leak detection system 1 includes a pressure system 5. The pressure system may include various tubes, valves, seals, containers, vessels, heat exchangers, pumps, pipelines, conduits, and other similar components to retain and/or transport fluids through the pressure system 5. As explained above, examples of the pressure system 5 include a pipeline for transporting natural gas or other hydrocarbons or other fluids, blow-out preventers, various wells including casing and other completion components, hydraulic or fuel lines, fluid storage containers, and other types of systems for transporting or retaining fluids.

The pressure system 5 may contain fluids such as gases, liquids, or combinations thereof, including any solid components entrained within the fluid. Examples of fluids include crude oil, methane, natural gas, carbon dioxide, hydrogen sulfide, natural gas liquids, and the like. Where the pressure system 5 comprises an exploration oil or gas well, the fluids typically include drilling fluids, lost circulation materials, various solids, drilled formation solids, and formation fluids and gases.

The leak detection system 1 may include a fluid pumping unit 10, which may be a cementing unit or a pump. The fluid pumping unit 10 is coupled to the pressure system 5. The fluid pumping unit 10 supplies a selected or particular volume of a test fluid from a source or reservoir of fluid to the pressure system 5. The selected or particular volume may be based on a desired pressure for the pressure system 5; that is, the volume supplied may be chosen such that the pressure system 5 reaches a desired pressure. The test fluid may comprise water, water with additional additives, drilling fluid, completion fluid or a fluid of the type already present in the pressure system 5, or other combinations thereof. The selected volume of test fluid depends, in part, on the size or total volume of the pressure system 5, and can be from small amounts, such as microliters for laboratory equipment, to large amounts, such as barrels and more, for large pressure systems, such as pipelines and oil and gas wells. Adding test fluid to the pressure system 5 raises the pressure at which the fluid within the pressure system 5 is confirmed, such that a test pressure is reached that is greater than the initial pressure of the fluid in the pressure system 5. The pressure system 5 may be shut-in once the pressure system 5 reaches a desired test pressure.

Optionally, a flow meter 30 is coupled to the fluid pumping unit 10 to sense the amount of fluid being added to the pressure system 5. The flow meter 30 may comprise a venturi flow meter, a pressure flow meter, a stroke counter, an impeller flow meter, or other similar flow meters. The flow meter 30 optionally displays a signal that indicates the flow of the fluid, such as a flow rate, via gauges and/or digital displays. The flow meter 30 optionally transmits a signal reflective of the flow rate to a processor 15, for example via sensor cables or wirelessly (e.g., via Internet 27 or another wireless network).

The leak detection system 1 also includes at least one pressure sensor 20 coupled to the pressure system 5. The pressure sensor 20 senses a pressure of the fluid within the pressure system 5 before, during, and after pressurization of the pressure system 5. In some embodiments, the pressure sensor 20 displays a signal that indicates the pressure of the fluid within the pressure system 5, for example via gauges and/or digital displays. The pressure sensor 20 transmits a signal that indicates the pressure to the processor 15, typically via sensor cables, although it is contemplated that the pressure sensor 20 can be configured to transmit the signal wirelessly. The pressure sensor 20 may be selected for the particular operating conditions, such as a pressure and temperature range that is expected for the fluid within the pressure system 5. For example, a pressure sensor 20 selected for use in a pressure system that is part of an oil well, such as a blowout preventer, would be capable of sensing a wide range of pressures at a wide range of temperatures.

The processor 15 may be a component in a variety of computers such as laptop computers, desktop computers, netbook and tablet computers, personal digital assistants, smartphones, and other similar devices and can be located at the testing site or remote from the site. One skilled in the art will appreciate that these computing devices include other elements in addition to the processor 15, such as display device 25, various types of storage, communication hardware, and the like. The processor 15 may be configured to execute particular software programs to aid in the testing of a pressure system 5. The functionality of these programs will be described in further detail below.

As noted above, the processor 15 may couple to a display device 25, in some cases by way of intermediate hardware such as a graphics processing unit or video card. The display device 25 includes devices such as a computer monitor, a television, a smartphone display, or other known display devices.

In connection with fluids and gases that exhibit a potentially significant change in pressure as a function of the fluid's temperature, it can be difficult to determine whether a change in pressure in a pressure system is merely a result of the change in temperature of the fluid, or if it is a result of a leak somewhere within the pressure system. For example, a fixed volume of a synthetic drilling fluid in a suitable container/pressure vessel used in oil and gas drilling exhibits a decreasing pressure as a function of decreasing temperature. Depending on the drilling fluid involved, the pressure can very significantly with temperature. In deep water offshore drilling, the drilling fluid may be at a particular temperature at the surface before being pressurized. As the pressure system is pressurized with drilling fluid, the temperature of the drilling fluid rises as a result of its increase in pressure, and thus may exceed the ambient temperature of the fluid when it was at the surface.

The fluid is subsequently cooled as it resides in a wellhead or blow-out preventer that can be several thousand feet below the surface of the ocean and on the sea floor where the ambient water temperature may be as low as 34° F. Thus, there is a large and rapid transfer of heat energy from the drilling fluid, through the containing drill pipe and/or riser, to the surrounding ocean, which, in turn, causes a sometimes significant decrease in the pressure of the fluid held within the pressure system. In accordance with various embodiments of the present disclosure, a system and method for analyzing pressure response of the pressure system to determine the presence of a leak in the pressure system distinguishes a drop in pressure caused by the decrease in temperature from a drop in pressure caused by a leak within the pressure system.

It is contemplated that the test pressure data acquired and stored in the computer readable medium optionally undergoes some form of data smoothing or normalizing processes to eliminate spikes or data transients. For example, one may use procedures to perform a moving average, curve fitting, and other such data smoothing techniques.

Figure 2:
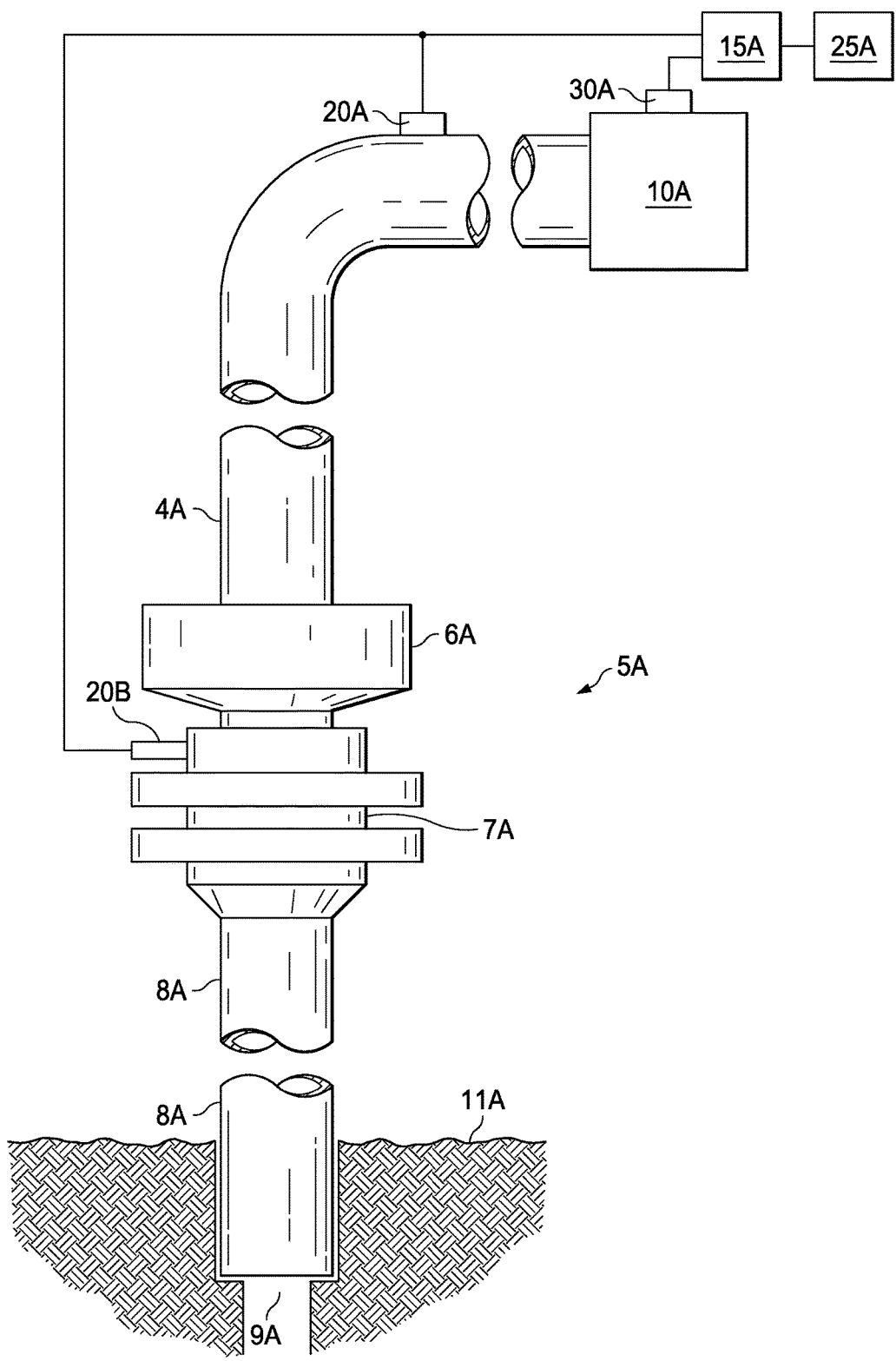
FIG. 2 shows an exemplary leak detection system used to test a blowout preventer on an oil rig in accordance with various embodiments.

FIG. 2 shows an exemplary embodiment of the leak detection system in the context of a deepwater exploration well in which the blowout preventer and, more specifically, various subcomponents of the blowout preventer that can be hydraulically isolated from the other components, are tested for leaks and pressure integrity. The leak detection system of FIG. 2 is associated with a pressure system 5A that includes, in this example, flow line 4A (which may be one or more flow lines) that couple a fluid pumping unit 10A, typically a cementing unit when on a drilling rig, to one or more annular blowout preventers 6A and one or more shear rams and/or pipe rams 7A. Additionally, FIG. 2 also illustrates the casing 8A, open well bore 9A, and the formation or geological structure/rock 11A that surrounds the open well bore 9A. The various embodiments of the present disclosure extend to all such elements for leak detection and pressure integrity testing.

Also illustrated in FIG. 2 is a flow meter or flow sensor 30A coupled to a processor 15A as previously described. Also illustrated are two pressure sensors 20A and 20B coupled to the pressure system 5A, one at the surface and one at the blowout preventer. In certain embodiments, other pressure sensors may be located at the same or different locations of the pressure system 5A. The pressure sensors 20A and 20B shown are coupled to the processor 15A as described above. A display device 25A, comparable to that described above, is also coupled to the processor 15A.

A further application and benefit of the disclosed methods and systems accrue in the particular scenario in which a low pressure test precedes a high pressure test. The ability to detect a leak during the low pressure test, something difficult given the resolution and capability of prior art methods, for example using a circular chart recorder, permits a user of the present disclosure to take remedial action to investigate and/or to stop a leak following a the low pressure test and before preceding to the high pressure test phase. Taking preventive or remedial action at the low pressure test phase reduces risk to equipment that might fail catastrophically under high pressures; reduces risk to personnel that might otherwise be in the area of the equipment or pressure systems during which the pressure systems fail while they undergo a high pressure test; reduces the risk to the environment should the pressure systems otherwise fail while they undergo a high pressure test; and reduces the time to detect the leak because a leak could potentially be discovered at the low pressure stage before undertaking the time and money to conduct a high pressure test.

Figure 3:
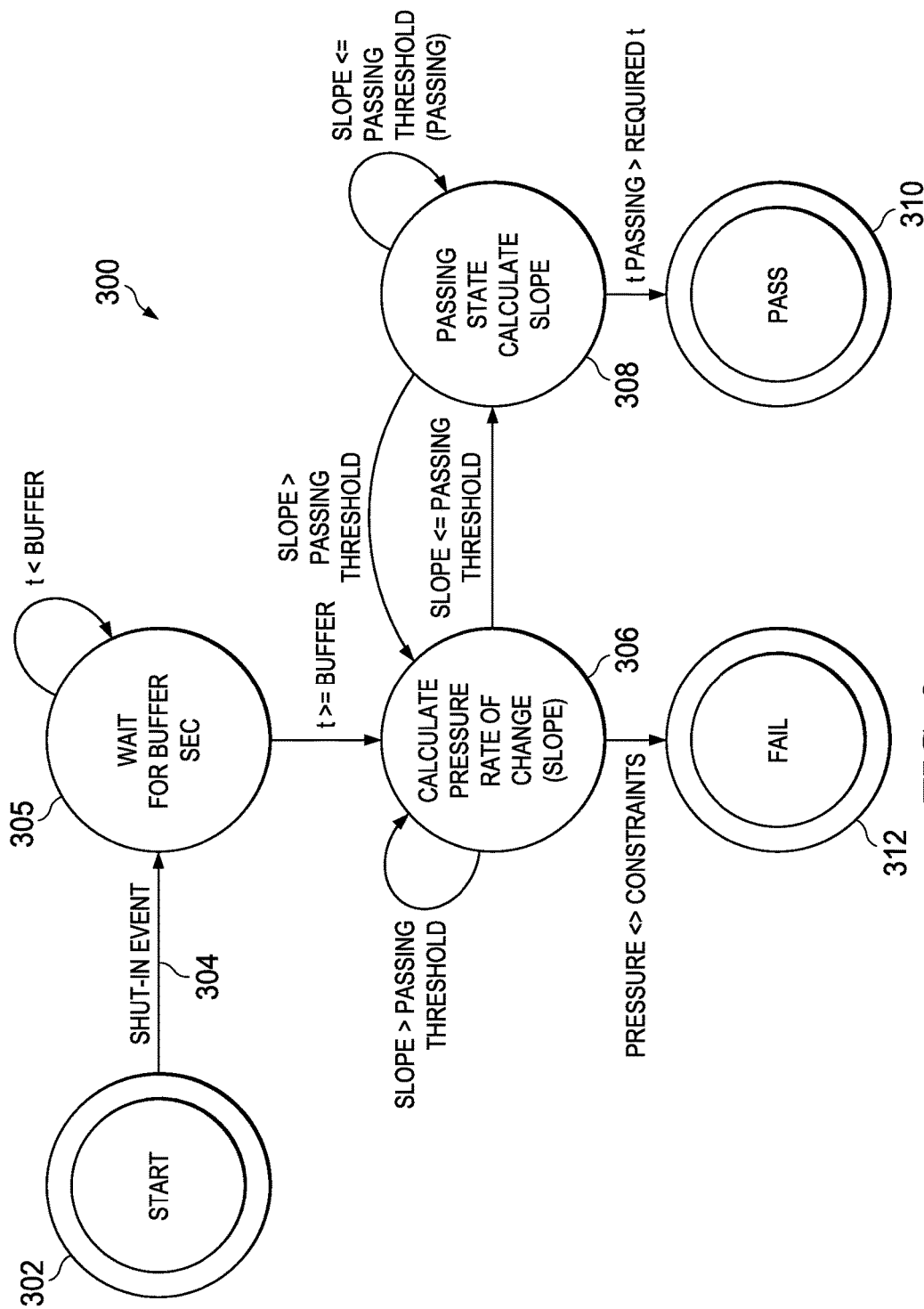
FIG. 3 shows a flow chart and state diagram of a method for determining the presence of a leak in a pressure system in accordance with various embodiments.

Turning now to FIG. 3, a method 300 for determining the presence of a leak in a pressure system 5 is shown in accordance with various embodiments. The method 300 begins in block 302, where the pressure system 5 may be pressurized, for example by a pump device. Upon a shut-in event 304, the method proceeds to block 305 to wait for a buffer time period before beginning analysis of the pressure system 5. In some embodiments, the buffer period enables a pre-determined amount of data (e.g., to perform a first determination of a pressure rate of change) to be obtained. When the buffer time period is complete, the method 300 continues to determining a slope of pressure data, which is based on pressure data received by the processor 15 (e.g., from the pressure sensor 20). In accordance with various embodiments, if the pressure slope is greater than a predetermined threshold, the method 300 continues to determine the pressure slope in block 306. In some cases, the predetermined threshold is a value determined through practical application such that a slope in excess of the threshold is likely to indicate that the pressure system 5 is still responding, in large part, to the change in temperature of the fluid in the pressure system 5. Similarly, a slope below the threshold is likely to indicate that the pressure system 5 is no longer responding, for the most part, to the change in temperature of the fluid in the pressure system 5.

When the slope is below the predetermined threshold, the method 300 enters a passing state in block 308 and continues to determine the pressure slope, remaining in the passing state provided that the slope is below the predetermined threshold. If the slope exceeds the predetermined threshold in block 308, the method 300 continues with exiting the passing state and returning to block 306 where the slope is again determined to identify whether it drops below the predetermined threshold, which causes the method 300 to return to the passing state block 308.

However, if the pressure slope remains below the predetermined threshold in block 308 for at least a predetermined time period (e.g., 5 minutes), the method 300 continues to block 310 where a passing indication is generated, for example for display on the display device 25 or for transmittal via a network such as Internet 27 to another computing device 28 or another display device.

In some embodiments, the method 300 also includes generating a failing indication in block 312 if pressure data received from the pressure sensor 20 indicates that the pressure value has fallen out of a predetermined range (e.g., the pressure of the pressure system 5 is below a minimum pressure value). Alternately, the method 300 may include generating a failing indication in block 312 if the slope of the pressure data received from the pressure sensor 20 indicates that the slope is outside of a predetermined range.

In accordance with various embodiments, the slope of the pressure data received from the pressure sensor 20 may be determined (e.g., by the processor 15) over a time period less than the predetermined time period for generating a passing indication. For example, although the time period for generating a passing indication may be 5 minutes, the slope may be determined over a one-minute time period, a 30-second time period, or time period of less than one second. As explained above, noise (e.g., environmental noise) may be introduced to the pressure data from the pressure sensor 20. In certain embodiments, the pressure data may thus undergo data smoothing or normalizing processes to eliminate noise, such as spikes or data transients. For example, a moving average, curve fitting, and other such data smoothing techniques may be applied to the pressure data prior to determining a slope of the pressure data.

Figure 4:
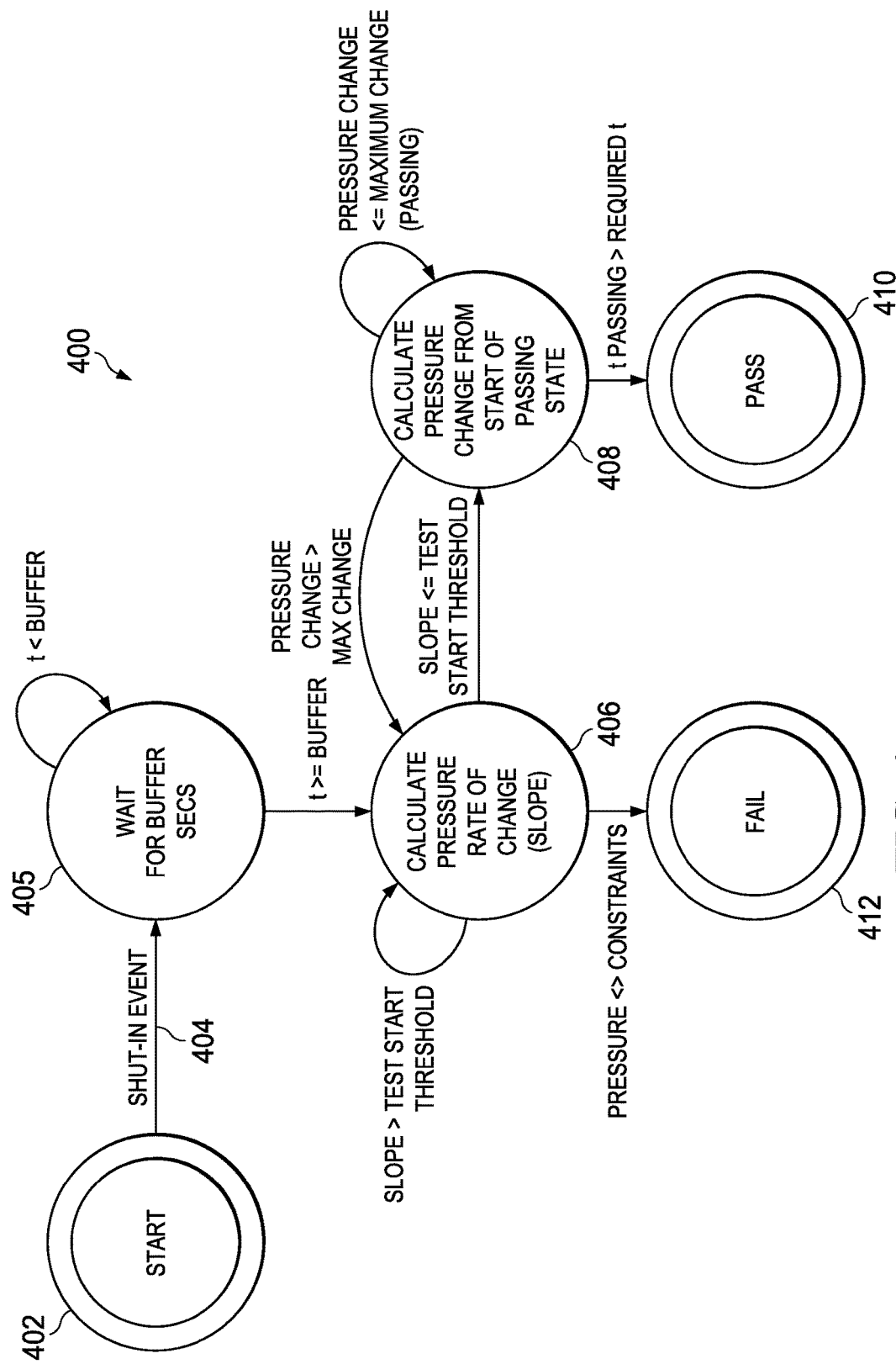
FIG. 4 shows another flow chart and state diagram of a method for determining the presence of a leak in a pressure system in accordance with various embodiments.

Turning now to FIG. 4, a method 400 for determining the presence of a leak in a pressure system 5 is shown in accordance with various embodiments. The method 400 begins in block 402, where the pressure system 5 may be pressurized, for example by a pump device. Upon a shut-in event 304, the method proceeds to block 305 to wait for a buffer time period before beginning analysis of the pressure system 5. The buffer period may serve as an initial data-gathering period as explained above. When the buffer time period is complete, the method 400 continues to determining a slope of pressure data, which is based on pressure data received by the processor 15 (e.g., from the pressure sensor 20). In accordance with various embodiments, if the pressure slope is greater than a predetermined threshold, the method 400 continues to determine the slope in block 406. In some cases, the predetermined threshold is a value determined through practical application such that a slope in excess of the threshold is likely to indicate that the pressure system 5 is still responding, in large part, to the change in temperature of the fluid in the pressure system 5. Similarly, a slope below the threshold is likely to indicate that the pressure system 5 is no longer responding, for the most part, to the change in temperature of the fluid in the pressure system 5.

When the slope is below the predetermined threshold, the method 400 enters a passing state in block 408 and begins to monitor the absolute pressure change from the time the passing state is entered. The method 400 remains in the passing state (block 408) provided that the absolute pressure change remains below a maximum permitted change in pressure. If the absolute pressure change from the time the passing state is entered exceeds the maximum permitted change in block 408, the method 400 continues with exiting the passing state and returning to block 406 where the slope is determined to identify whether it drops below the predetermined threshold, which causes the method 400 to return to the passing state block 408.

However, if the absolute pressure change remains below the maximum permitted change in pressure in block 408 for at least a predetermined time period (e.g., 5 minutes), the method 400 continues to block 410 where a passing indication is generated, for example for display on the display device 25 or for transmittal via a network such as Internet 27 to another computing device 28.

In some embodiments, the method 400 also includes generating a failing indication in block 412 if pressure data received from the pressure sensor 20 indicates that the pressure value has fallen out of a predetermined range (e.g., the pressure of the pressure system 5 is below a minimum pressure value). Alternately, the method 400 may include generating a failing indication in block 412 if the slope of the pressure data received from the pressure sensor 20 indicates that the slope is outside of a predetermined range.

As above, the slope of the pressure data received from the pressure sensor 20 may be determined (e.g., by the processor 15) over a time period less than the predetermined time period for generating a passing indication. For example, although the time period for generating a passing indication may be 5 minutes, the slope may be determined over a one-minute time period, a 30-second time period, or time period of less than one second. As explained above, noise (e.g., environmental noise) may be introduced to the pressure data from the pressure sensor 20. In certain embodiments, the pressure data may thus undergo data smoothing or normalizing processes to eliminate noise, such as spikes or data transients. For example, a moving average, curve fitting, and other such data smoothing techniques may be applied to the pressure data prior to determining a rate of change.

Figure 5:
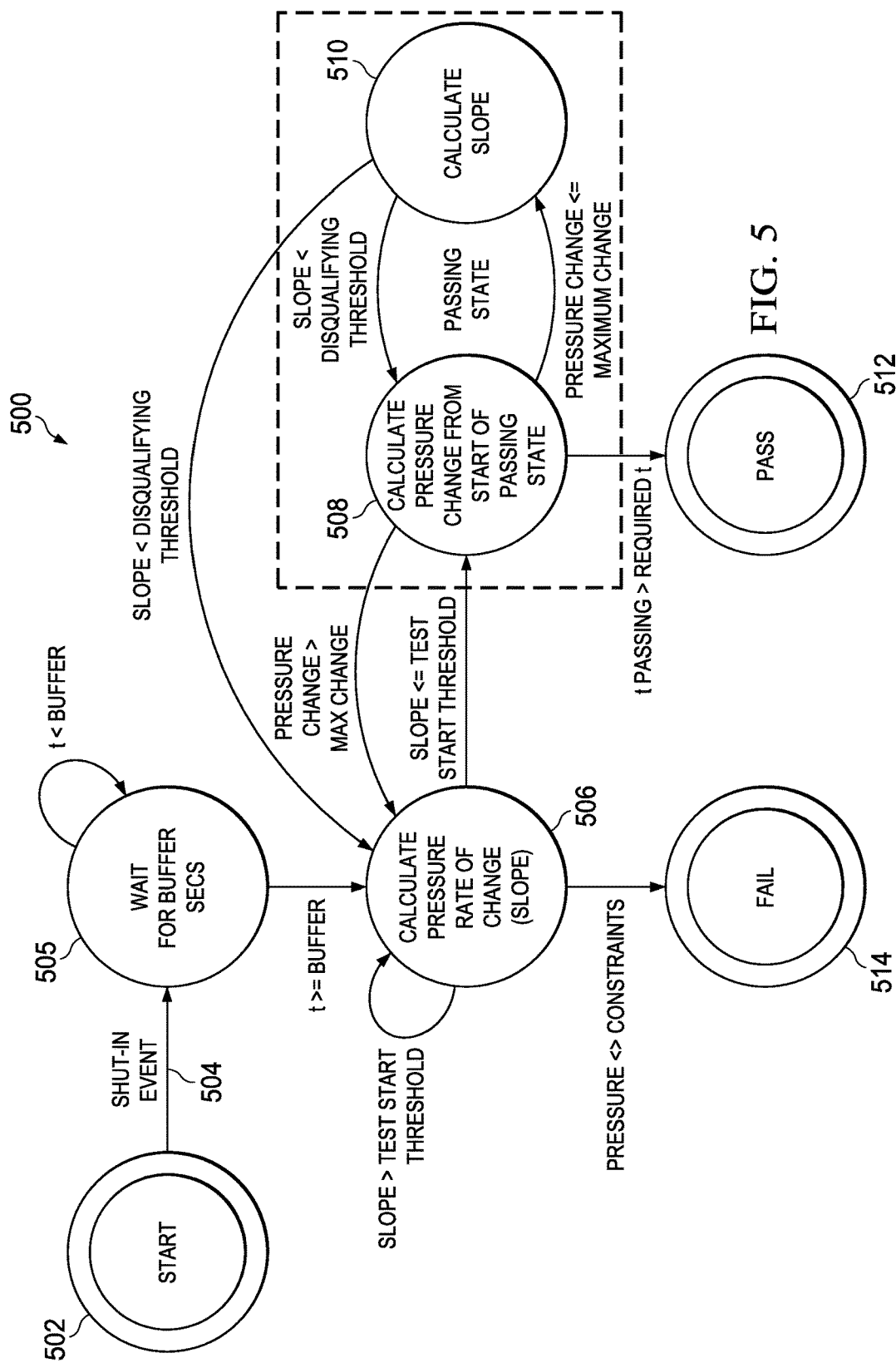
FIG. 5 shows another flow chart and state diagram of a method for determining the presence of a leak in a pressure system in accordance with various embodiments.

FIG. 5 shows a method 500 for determining the presence of a leak in a pressure system 5, which combines aspects of FIGS. 3 and 4. The method 500 is similar to methods 300 and 400 in blocks 502-506. Further, the method 500 also enters the passing state in block 508 in response to the slope being below a predetermined threshold. In the passing state (blocks 508 and 510), both the pressure slope and the absolute pressure change from the time the passing state is entered are monitored. The method 500 remains in the passing state provided that the slope is below the predetermined threshold, a threshold that may in some embodiments change over time to narrow the allowable slope as time passes, and that the absolute pressure change is below a maximum permitted change in pressure. If either the slope exceeds the predetermined threshold (in block 510) or the absolute pressure change from the time the passing state is entered exceeds the maximum permitted change in pressure (in block 508), the method 500 exits the passing state and returns to block 506. While in block 506, if the slope drops below the predetermined threshold, the method 500 returns to the passing state of blocks 508 and 510.

However, if the slope remains below the predetermined threshold in block 510 and the absolute pressure change from the time the passing state is entered remains below the maximum permitted change in pressure in block 508 for at least a predetermined time period (e.g., 5 minutes), the method 500 continues to block 512 where a passing indication is generated, for example for display on the display device 25 or for transmittal via a network such as Internet 27 to another computing device 28.

In some embodiments, the method 500 also includes generating a failing indication in block 514 if pressure data received from the pressure sensor 20 indicates that the pressure value has fallen out of a predetermined range (e.g., the pressure of the pressure system 5 is below a minimum pressure value). Alternately, the method 500 may include generating a failing indication in block 514 if the slope of the pressure data received from the pressure sensor 20 indicates that the slope is outside of a predetermined range.

Figure 6:
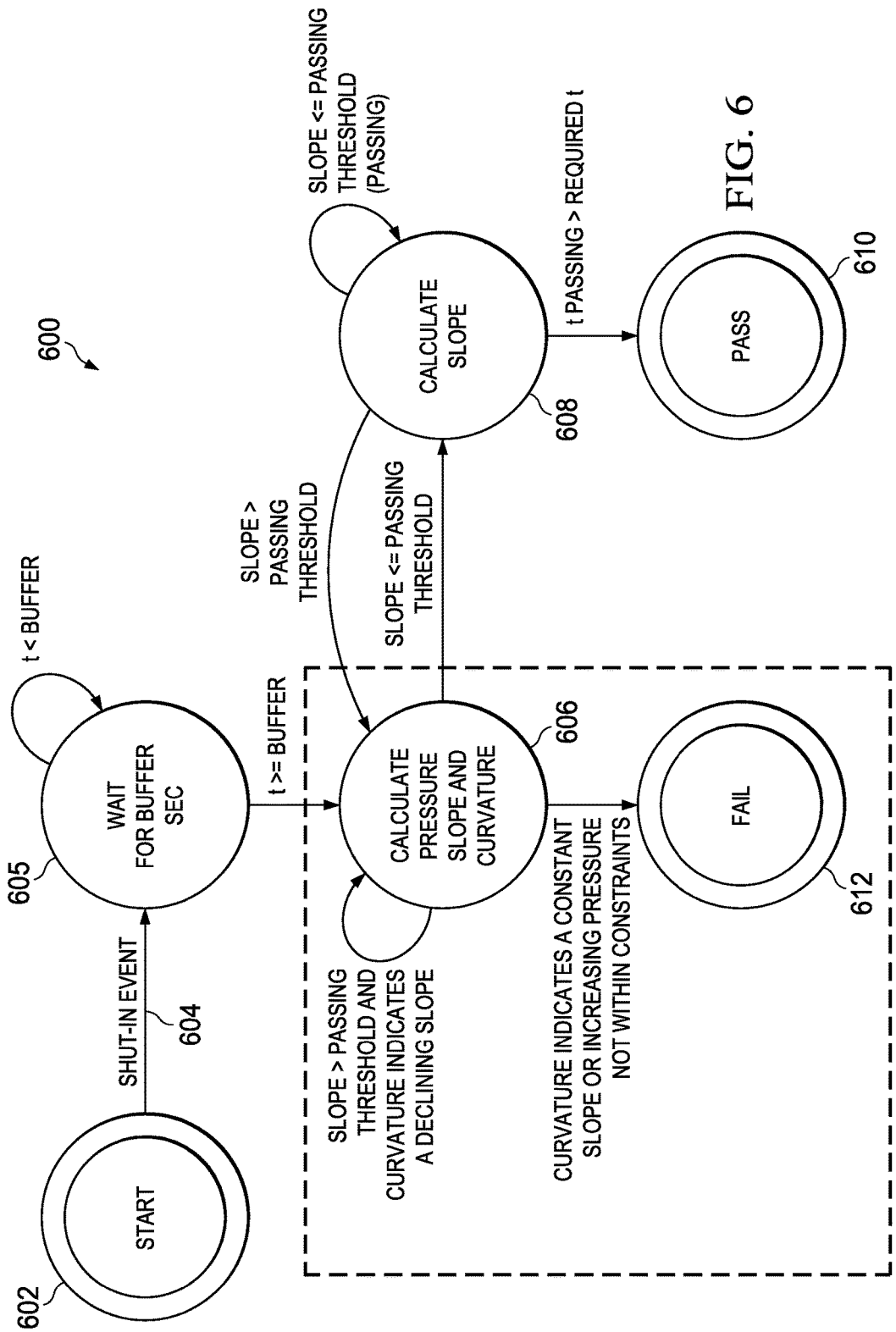
FIG. 6 shows another flow chart and state diagram of a method for determining the presence of a leak in a pressure system in accordance with various embodiments.

FIG. 6 shows a method 600 for determining the presence of a leak in a pressure system 5 in accordance with various embodiments. The method 600 is similar to methods 300, 400, and 500 in blocks 602-605. When the buffer time period is complete in block 605, the method 600 continues to block 606 and determining a slope of pressure data as well as determining a curvature of the pressure data (i.e., a second derivative of pressure data or a derivative of the slope), both of which are based on pressure data received by the processor 15 (e.g., from the pressure sensor 20).

In accordance with various embodiments, if the pressure slope is above a predetermined threshold and the curvature indicates a declining slope, the method 600 continues to determine the pressure slope and curvature in block 606. If the curvature indicates an absolute value of the slope is decreasing, it is likely that the pressure slope is improving and will eventually fall below the predetermined threshold and further analysis may result in a passing test. On the other hand, if the curvature indicates an absolute value of the slope is constant or increasing, it is likely that the slope is not significantly improving and a the current slope indicates the presence of a leak. In some cases, rather than comparing the curvature to indications of increasing, constant, or decreasing slope, the curvature may be compared to a predetermined threshold, which is a value determined through practical application such that a curvature in excess of the threshold is likely to indicate that the pressure slope is not significantly improving and the current slope indicates a leak. Similarly, a curvature below the threshold is likely to indicate that the slope, while not below the predetermined maximum passing value, is improving and further analysis may result in a passing test. If the slope is not below the predetermined threshold, the method 600 remains in block 606. Additionally, if the curvature indicates a constant or increasing slope, the method 600 may continue to block 612 with generating a failing indication or an indication that test failure is likely or imminent.

When the slope is below a predetermined threshold, the method 600 enters a passing state in block 608 and continues to determine the slope, remaining in the passing state provided that the slope is below the predetermined threshold. If the slope exceeds the predetermined threshold in block 608, the method 600 continues with exiting the passing state and returning to block 606 where the curvature and slope are again determined to identify whether the slope drops below the predetermined threshold, which causes the method 600 to return to the passing state in block 608, or whether the curvature indicates that the slope is not improving. However, as above, if the slope remains below the predetermined threshold in block 608 for at least a predetermined time period (e.g., 5 minutes), the method 600 continues to block 610 where a passing indication is generated, for example for display on the display device 25 or for transmittal via a network such as Internet 27 to another computing device 28. Additionally, although not illustrated for brevity, the method 600 may transition to the passing state as shown in FIGS. 4 and 5 as well.

In accordance with various embodiments, the slope and curvature of the pressure data received from the pressure sensor 20 may be determined (e.g., by the processor 15) over a time period less than the predetermined time period for generating a passing indication. For example, although the time period for generating a passing indication may be 5 minutes, the slope and curvature may be determined over a one-minute time period, a 30-second time period, or time period of less than one second. As explained above, noise (e.g., environmental noise) may be introduced to the pressure data from the pressure sensor 20. In certain embodiments, the pressure data may thus undergo data smoothing or normalizing processes to eliminate noise, such as spikes or data transients. For example, a moving average, curve fitting, and other such data smoothing techniques may be applied to the pressure data prior to determining the slope or curvature.

In certain embodiments, after generating either a passing indication, a curve-fitting algorithm may be applied to the pressure data. This application may utilize a variety of curve fitting approaches, such as least squares, and a variety of curve types, such as polynomials, exponential, ellipses including combinations of curves to best arrive at a mathematical form, such as a formula or equation, that describes pressure data change and value over time. Statistical values for "goodness of fit," such as standard deviations and "R-squared," may be utilized to determine if a function or equation adequately describes the pressure data in a mathematical form. In accordance with various embodiments, the mathematical form may be used as a replacement for raw data as a benchmark for comparative tests and is beneficial because smoothed data can provide a boost in computational efficiency without compromising accuracy when compared to methods and system using raw data as a benchmark.

Referring briefly back to FIG. 1, the processor 15 is configured to execute instructions read from a computer readable medium, and may be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. The program/data storage 35 is a computer-readable medium coupled to and accessible to the processor 15. The storage 35 may include volatile and/or non-volatile semiconductor memory (e.g., flash memory or static or dynamic random access memory), or other appropriate storage media now known or later developed. Various programs executable by the processor 15, and data structures manipulatable by the processor 15 may be stored in the storage 30. In accordance with various embodiment, the program(s) stored in the storage 30, when executed by the processor 15, may cause the processor 15 to carry out any of the methods described herein.

The above discussion is meant to be illustrative of the principles and various embodiments of the present disclosure. Numerous variations and modifications will become apparent to those skilled in the art once the above disclosure is fully appreciated. For example, while the embodiments are discussed relating to pressure data from a blowout preventer on a drilling rig, it is understood that embodiments of the presently disclosed system and method of detecting leaks may be applied to pressure systems and fluid systems of other types, as disclosed and discussed above. It is intended that the following claims be interpreted to embrace all such variations and modifications.

What is claimed is:
1. A method for determining the presence of a leak in a pressure system comprising a blowout preventer, the method comprising:
   pressurizing the pressure system by a pump;

upon the pressure system reaching a test pressure, shutting in the pressure system by a valve, the pump coupled to the pressure system via the valve;

receiving, by a processor, pressure data of the pressure system after shut-in of the pressure system;

determining, by the processor, a pressure slope based on the pressure data;

entering a passing state in response to the pressure slope being less than a test start threshold;

remaining in the passing state provided that a total change in pressure while in the passing state is less than a maximum permitted change in pressure threshold;

generating a passing indication as a result of remaining in the passing state for at least a predetermined time period; and in response to the generation of the passing indication, adjusting one or more components of the pressure system in preparation for additional pressure testing.

2. The method of claim 1 further comprising generating a failing indication as a result of the pressure or pressure slope having a value falling outside a predetermined range.

3. The method of claim 1 wherein the pressure slope is determined over a time period less than the predetermined time period.

4. The method of claim 1 further comprising, after generating the passing indication, applying a curve-fitting algorithm to the pressure data to generate a mathematical form that represents the pressure data.

5. The method of claim 1 further comprising exiting the passing state in response to the change in pressure while in the passing state being greater than the maximum permitted change in pressure threshold.

6. A method for determining the presence of a leak in a pressure system comprising a blowout preventer, the method comprising:

pressurizing the pressure system by a pump;

isolating a portion of the pressure system by adjusting one or more physical components of the pressure system in preparation for a pressure test;

receiving, by a processor, pressure data of the portion of the pressure system after said adjustment;

determining, by the processor, a pressure slope based on the pressure data;

entering a passing state in response to the pressure slope being less than a test start threshold;

remaining in the passing state provided that a total change in pressure while in the passing state is less than a maximum permitted change in pressure threshold; and generating a passing indication as a result of remaining in the passing state for at least a predetermined time period.

7. The method of claim 6 further comprising generating a failing indication as a result of the pressure or pressure slope having a value falling outside a predetermined range.

8. The method of claim 6 wherein the pressure slope is determined over a time period less than the predetermined time period.

9. The method of claim 6 further comprising, after generating the passing indication, applying a curve-fitting algorithm to the pressure data to generate a mathematical form that represents the pressure data.

10. The method of claim 6 further comprising exiting the passing state in response to the pressure slope being greater than the predetermined slope threshold.

11. A system for determining the presence of a leak in a pressure system comprising a blowout preventer, the system comprising:

at least one pressure sensor coupled to the pressure system;

a processor coupled to the pressure sensor, the processor to:

receive pressure data from the pressure sensor after shut-in of the pressure system;

determine a pressure slope based on the pressure data;

enter a passing state in response to the pressure slope being less than a test start threshold;

remain in the passing state provided that a total change in pressure while in the passing state is less than a maximum permitted change in pressure threshold; and generate a passing indication as a result of remaining in the passing state for at least a predetermined time period; and a pump coupled to the pressure system via a valve to selectively permit flow between the pump and the pressure system, the pump to pressurize the pressure system and the valve to, upon the pressure system reaching a test pressure, shut in the pressure system.

12. The system of claim 11 wherein the processor is to generate a failing indication as a result of the pressure or pressure slope having a value falling outside a predetermined range.

13. The system of claim 11 wherein the processor is to determine the pressure slope over a time period less than the predetermined time period.

14. The system of claim 11 wherein the processor is to, after generating the passing indication, apply a curve-fitting algorithm to the pressure data to generate a mathematical form that represents the pressure data.

15. The system of claim 11 wherein the processor is to exit the passing state in response to a change in pressure while in the passing state being greater than the maximum permitted change in pressure threshold.

16. A system for determining the presence of a leak in a pressure system comprising a blowout preventer, the system comprising:

at least one pressure sensor coupled to the pressure system;

a processor coupled to the pressure sensor, the processor to:

receive pressure data of the pressure system after shut-in of the pressure system;

determine a pressure slope based on the pressure data;

enter a passing state in response to the pressure slope being less than a predetermined slope threshold;

remain in the passing state provided that a total change in pressure while in the passing state is less than a maximum permitted change in pressure threshold; and generate a passing indication as a result of remaining in the passing state for at least a predetermined time period; and a pump coupled to the pressure system via a valve to selectively permit flow between the pump and the pressure system, the pump to pressurize the pressure system and the valve to, upon the pressure system reaching a test pressure, shut in the pressure system.

17. The system of claim 16 wherein the processor is to generate a failing indication as a result of the pressure or pressure slope having a value falling outside a predetermined range.

18. The system of claim 16 wherein the processor is to determine the pressure slope over a time period less than the predetermined time period.

19. The system of claim 16 wherein the processor is to apply, after generating the passing indication, a curve-fitting algorithm to the pressure data to generate a mathematical form that represents the pressure data.

20. The system of claim 16 wherein the processor is to exit the passing state in response to the pressure slope being greater than the predetermined slope threshold.

* * * * *